United States Patent
Jalloul et al.

(10) Patent No.: US 9,236,975 B2
(45) Date of Patent: Jan. 12, 2016

(54) MOBILE SUBSCRIBER INFORMATION TRANSMISSION OVER MULTIPLE UPLINK FRAMES

(75) Inventors: Louay Jalloul, San Jose, CA (US); Djordje Tujkovic, Santa Clara, CA (US); Bertrand Hochwald, South Bend, IN (US)

(73) Assignee: Broadcom Corporation, Irvine, CA (US)

( * ) Notice: Subject to any disclaimer, the term of this patent is extended or adjusted under 35 U.S.C. 154(b) by 570 days.

(21) Appl. No.: 13/043,239

(22) Filed: Mar. 8, 2011

(65) Prior Publication Data

US 2012/0057477 A1 Mar. 8, 2012

Related U.S. Application Data

(63) Continuation-in-part of application No. 12/837,400, filed on Jul. 15, 2010.

(60) Provisional application No. 61/315,276, filed on Mar. 18, 2010, provisional application No. 61/311,766, filed on Mar. 8, 2010.

(51) Int. Cl.
| | |
|---|---|
| *H04L 1/00* | (2006.01) |
| *H04L 5/00* | (2006.01) |
| *H04W 8/20* | (2009.01) |
| *H04W 24/10* | (2009.01) |
| *H04W 76/02* | (2009.01) |

(52) U.S. Cl.
CPC ............ *H04L 1/0007* (2013.01); *H04L 1/0002* (2013.01); *H04L 5/0044* (2013.01); *H04L 5/006* (2013.01); *H04L 5/0007* (2013.01); *H04L 5/0053* (2013.01); *H04L 5/0091* (2013.01); *H04W 8/20* (2013.01); *H04W 24/10* (2013.01); *H04W 76/02* (2013.01)

(58) Field of Classification Search
None
See application file for complete search history.

(56) References Cited

U.S. PATENT DOCUMENTS

| | | | |
|---|---|---|---|
| 2002/0080719 A1 | 6/2002 | Parkvall et al. | |
| 2003/0050074 A1 | 3/2003 | Kogiantis et al. | |
| 2005/0060094 A1 | 3/2005 | Lee et al. | |
| 2005/0105647 A1 | 5/2005 | Wilhelmsson et al. | |
| 2006/0291430 A1 | 12/2006 | Putzolu et al. | |
| 2007/0140167 A1 | 6/2007 | Jang et al. | |

(Continued)

FOREIGN PATENT DOCUMENTS

| | | |
|---|---|---|
| CN | 101132201 A | 2/2008 |
| WO | WO 2011/112639 A1 | 9/2011 |

OTHER PUBLICATIONS

International Search Report for International Application No. PCT/US2011/027623, United States Patent and Trademark Office, United States, mailed on Jun. 1, 2011.

(Continued)

*Primary Examiner* — Marcus R Smith
(74) *Attorney, Agent, or Firm* — Sterne, Kessler, Goldstein & Fox, P.L.L.C.

(57) ABSTRACT

Methods and apparatuses of a mobile subscriber transmitting information to a base station are disclosed. One method includes identifying an uplink transmission condition. If the uplink transmission condition is identified, the mobile subscriber transmits a message over multiple uplink frames using multiple uplink frame types. The mobile subscriber may inform the base station that it is transmitting the message over the multiple uplink frames.

24 Claims, 10 Drawing Sheets

(56) References Cited

U.S. PATENT DOCUMENTS

| | | |
|---|---|---|
| 2007/0248045 A1 | 10/2007 | Nagaraj |
| 2007/0253473 A1 | 11/2007 | Ishii et al. |
| 2008/0186881 A1 | 8/2008 | Ahl et al. |
| 2008/0285511 A1 | 11/2008 | Puri et al. |
| 2009/0092066 A1 | 4/2009 | Chindapol et al. |
| 2009/0092067 A1 | 4/2009 | Sudarshan et al. |
| 2009/0141696 A1* | 6/2009 | Chou et al. .................... 370/345 |
| 2009/0202013 A1* | 8/2009 | Sebastian ...................... 375/260 |
| 2009/0207762 A1* | 8/2009 | Jalloul et al. .................. 370/281 |
| 2009/0257366 A1* | 10/2009 | Power et al. ................... 370/280 |
| 2010/0189056 A1* | 7/2010 | Nishibayashi et al. ........ 370/329 |
| 2010/0226327 A1 | 9/2010 | Zhang et al. |
| 2010/0246518 A1 | 9/2010 | Gheorghiu et al. |
| 2011/0103406 A1* | 5/2011 | Cai et al. ........................ 370/480 |
| 2011/0110257 A1 | 5/2011 | Kim et al. |
| 2011/0110322 A1 | 5/2011 | Koyanagi et al. |
| 2011/0141981 A1* | 6/2011 | Ahmadi et al. ................ 370/329 |
| 2011/0216716 A1 | 9/2011 | Tujkovic et al. |
| 2012/0002568 A1 | 1/2012 | Tiirola et al. |

OTHER PUBLICATIONS

Office Action directed to related Chinese Patent Application No. 201180013034.9, mailed Sep. 3, 2014; 6 pages.

English-language abstract of Chinese Patent Application Publication No. 101132201 A; 1 page.

\* cited by examiner

MOBILE SUBSCRIBER INFORMATION TRANSMISSION OVER MULTIPLE UPLINK FRAMES

RELATED APPLICATIONS

This patent application is a continuation-in-part of U.S. patent application Ser. No. 12/837,400 filed Jul. 15, 2010, now U.S. Pat. No. 8,867,459, which claims priority to U.S. provisional patent application Ser. No. 61/311,766, filed on Mar. 8, 2010, and to U.S. provisional patent application Ser. No. 61/315,276, filed on Mar. 18, 2010, which are incorporated by reference.

FIELD OF THE DESCRIBED EMBODIMENTS

The described embodiments relate generally to wireless communication. More particularly, the described embodiments relate to methods and systems for mobile subscriber uplink transmission over multiple transmission frames.

BACKGROUND

Wireless communication systems are widely deployed to provide various types of communication content such as voice and data. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, Worldwide Interoperability for Microwave Access (WiMAX), and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

It is desirable to improve the quality of uplink transmission of a wireless multiple-access communication system.

SUMMARY

An embodiment includes a method of a mobile subscriber transmitting information to a base station. The method includes identifying an uplink transmission condition. If the uplink transmission condition is identified, the mobile subscriber transmits a message over multiple uplink frames. The mobile subscriber informs the base station that it is transmitting the message over the multiple uplink frames.

Another embodiment includes another method of a wireless system controlling uplink transmitting of information from a mobile station to a base station. The method includes at least one of the base station and the mobile subscriber identifying an uplink transmission condition. If the uplink transmission condition is identified, the mobile subscriber transmits a message over multiple uplink frames. Additionally, if the uplink transmission condition is identified, the mobile unit transmits the message over different sets of subcarriers for at least two of the multiple frames. The mobile subscriber informs the base station that it is transmitting the message over multiple uplink frames.

Another embodiment includes a mobile subscriber. The mobile subscriber includes a means for identifying an uplink transmission condition. If the uplink transmission condition is identified, the mobile subscriber transmits a message over multiple uplink frames. The mobile subscriber informs the base station that it is transmitting the message over multiple uplink frames.

Other aspects and advantages of the described embodiments will become apparent from the following detailed description, taken in conjunction with the accompanying drawings, illustrating by way of example the principles of the described embodiments.

DETAILED DESCRIPTION

Embodiments of systems, methods and apparatuses for improving the quality of uplink transmission of a mobile subscriber are disclosed.

Figure 1:
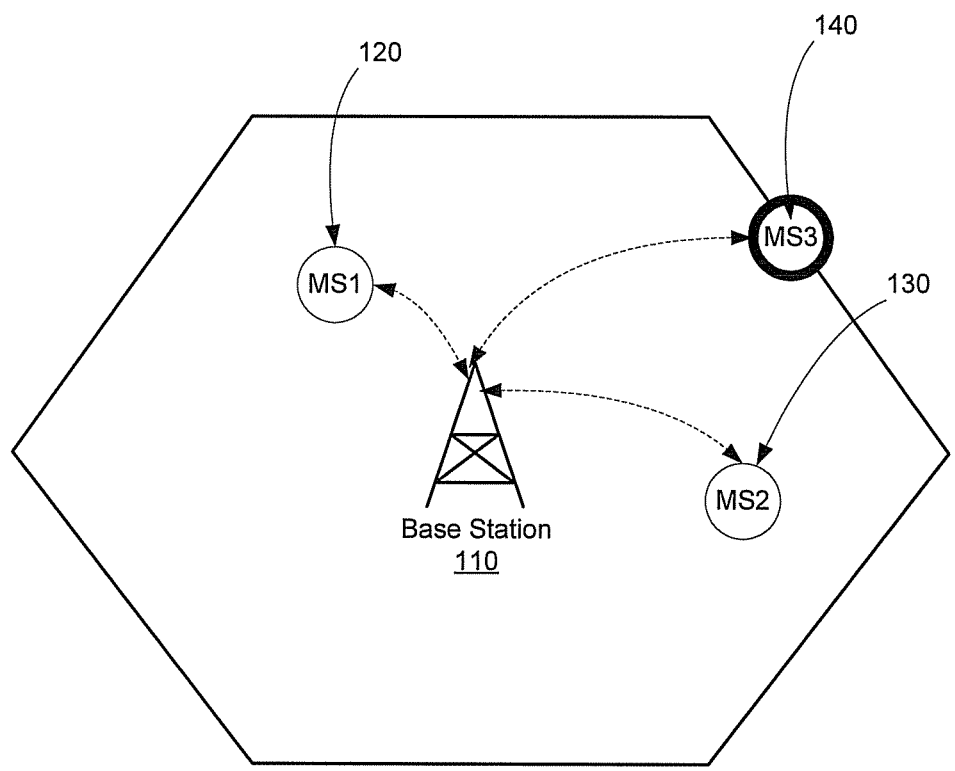
FIG. 1 shows a cell of a wireless system that includes a base station and mobile subscribers in which one of the mobile subscribers is subject to an uplink transmission condition.

FIG. 1 shows a cell of a wireless system that includes a base station 110 and mobile subscribers 120, 130, 140 in which one of the mobile subscribers 140 is subject to an uplink transmission condition. More specifically, as shown, the mobile subscriber is located at an edge of the cell. Typically, mobile subscribers located at cell edges have uplink transmission path losses that are the greatest, and can additionally suffer from interference from neighboring cells.

An uplink condition can be generally defined as a condition in which an available transmission power of the mobile station is not sufficient to meet a desired Quality of Service (QoS) at the base station. The uplink transmission condition can be due to one or more of many different factors. For example, the mobile subscriber may be limited by a power rating of a power amplifier of the mobile subscriber. Alternatively or additionally, the mobile subscriber may be limited by uplink transmission path loss, uplink interference, uplink signal to noise ratio (SNR), or by uplink transmit power spectral density.

If an uplink conditions is detected, the mobile subscriber can adapt to this condition by using the described embodiments for enhancing the uplink transmission. More specifically, the mobile subscriber transmits a message over multiple uplink frames. In order for the base station to adapt, the mobile subscriber informs the base station that it is transmitting the message over the multiple uplink frames.

In addition to transmitting the message over multiple uplink frames, the mobile unit can transmit the message over different sets of sub-carriers for at least two of the multiple uplink frames. For embodiments of the mobile subscriber that include multiple antennas, the mobile subscriber can introduce a cyclic delay between the antennas, wherein the cyclic delay varies between at least two of the multiple uplink frames. Additionally, or alternatively, the mobile subscriber can toggle between the antennas for at least two of the multiple uplink frames.

The messages transmitted by the mobile subscriber include encoded bits. For an embodiment, transmitting the message over multiple uplink frames includes transmitting a same message over multiple uplink frames. For another embodiment, transmitting a message over multiple uplink frames includes transmitting different subsets of the message over the multiple uplink frames. For a more specific embodiment, each subset of the message occupies a minimum time/frequency allocation as determined by a wireless system protocol (several to be described).

Figure 2:
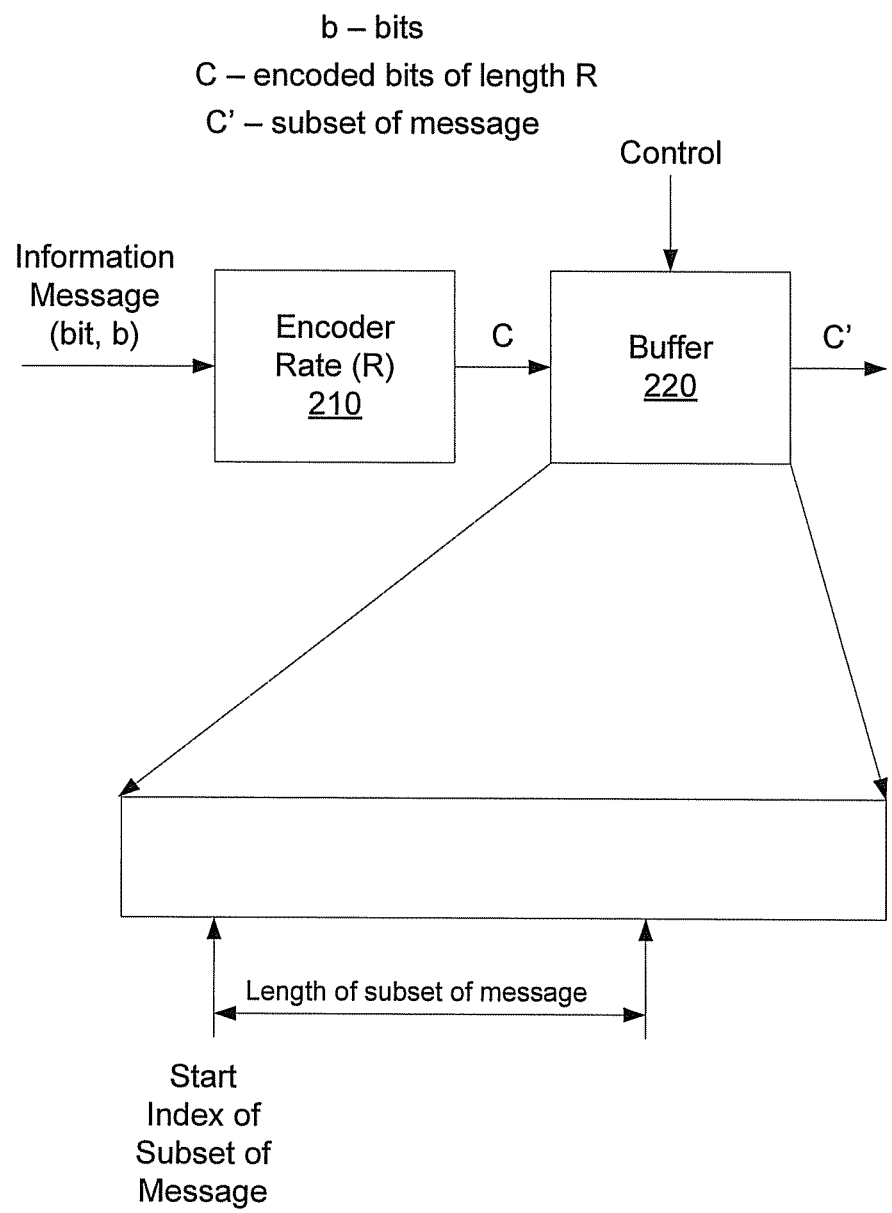
FIG. 2 shows an example of a portion of a transmit chain of a mobile subscriber for generating a message for uplink transmission.

FIG. 2 shows an example of a portion of a transmit chain of a mobile subscriber for generating a message (or a subset of a message) for uplink transmission. An encoder 210 receives information message bits of length B, which are encoded at a rate (R). The encoder 210 generates encoded bits of length $C=B\times1/R$, shown as C. A buffer 220 is controlled by a controller, and generates subset of the message as determined by a start index and a length.

Figure 3:
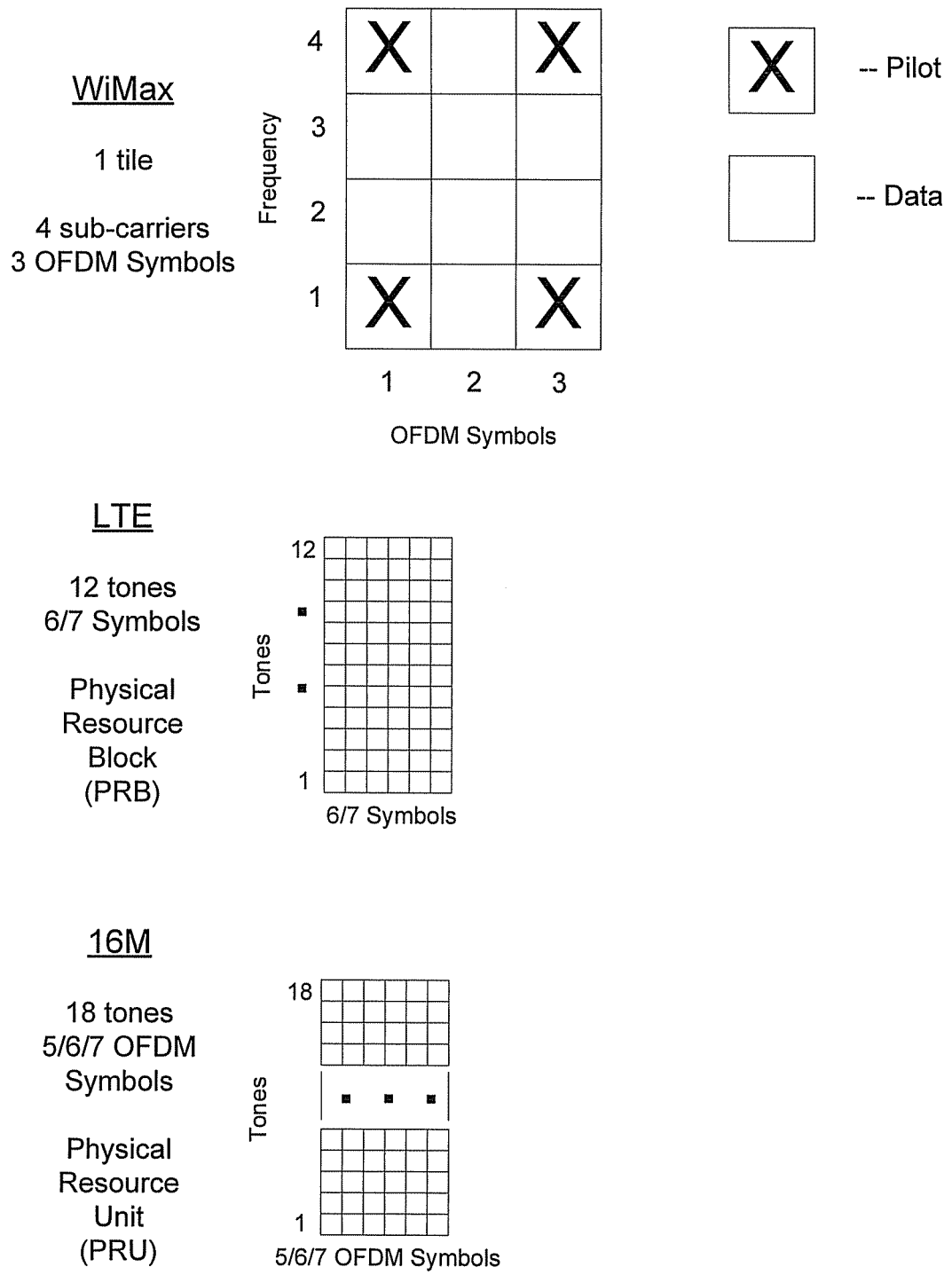
FIG. 3 shows examples of minimum time/frequency allocations for several different wireless system network standards.

FIG. 3 shows examples of minimum time/frequency allocations for several different wireless system network standards. A WiMAX (Worldwide Interoperability for Microwave Access) tile includes 4 sub-carriers amongst 3 OFDM (Orthogonal Frequency Division Multiplexed) symbols. An LTE (Long Term Evolution) physical resource block (PRB) includes 12 tones across 6-7 symbols. An IEEE (Institute of Electrical and Electronic Engineers) 802.16M physical resource (PRU) includes 18 tones spread across 5, 6 or 7 OFDM symbols.

Figure 4:
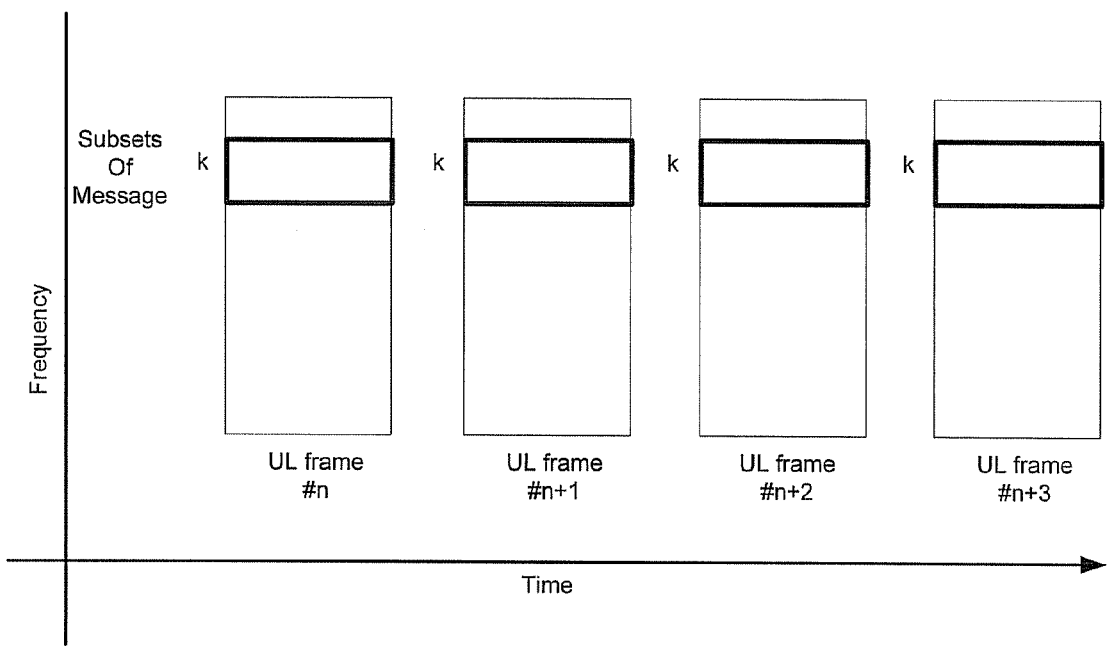
FIG. 4 shows an example of a message being uplink transmitted across several uplink frames.

FIG. 4 shows an example of a message being uplink transmitted across several uplink frames. As shown, a subset of the message is transmitted across the multiple uplink frames n, n+1, n+2, n+3 over, for example, a set of sub-carriers (k). Diversity (time) is provided by spreading the uplink transmission of the message over multiple uplink frames.

Figure 5:
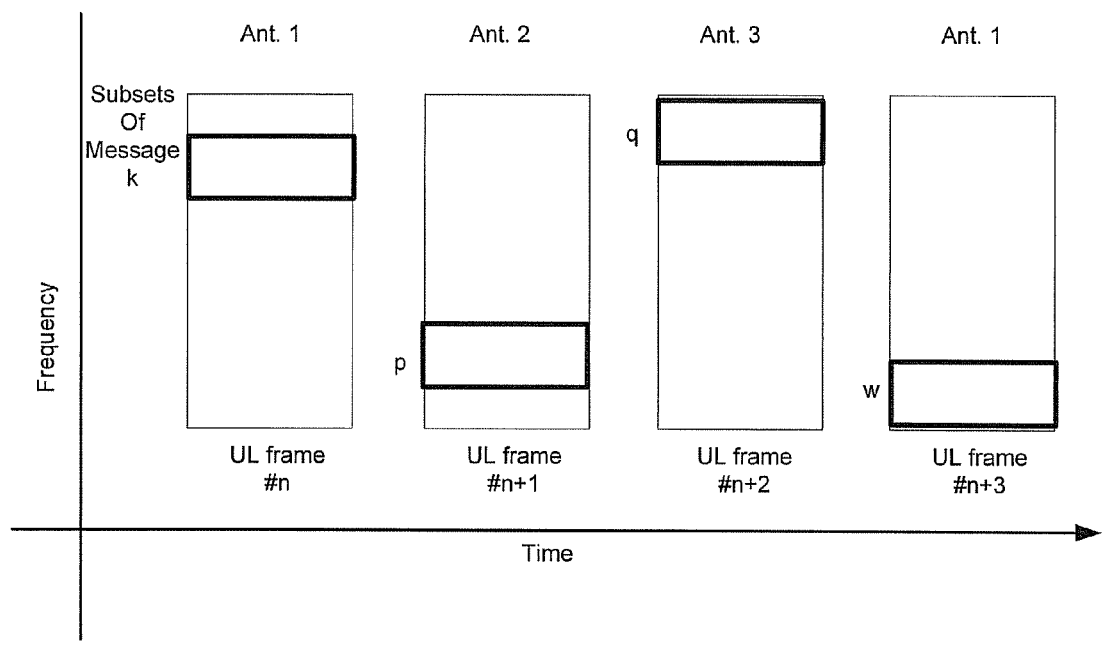
FIG. 5 shows an example of a message being uplink transmitted across several uplink frames, and at different frequencies.

FIG. 5 shows an example of a message being uplink transmitted across several uplink frames, and at different frequencies. Additionally diversity (frequency) is provided by varying the allocated frequency range of the subset of the message for each of the uplink frames n, n+1, n+2, n+3. That is, the subset being transmitted over the uplink frame #n occupy the set of k sub-carriers of the uplink frame. The subset being transmitted over the uplink frame #n+1 occupy the set of p sub-carriers of the uplink frame. The subset being transmitted over the uplink frame #n+2 occupy the set of q sub-carriers of the uplink frame. The subset being transmitted over the uplink frame #n+3 occupy the set of w sub-carriers of the uplink frame.

Additional diversity (spatial) can be realized by transmitting the different uplink frames over different antennas of the subscriber. For example, FIG. 5 shows the uplink frame #n being transmitted over a first antenna (Ant. 1), the uplink frame #n+1 being transmitted over the second antenna (Ant. 2), the uplink frame #n+2 being transmitted over the third antenna (Ant. 3), the uplink frame #n+3 being transmitted over the first antenna (Ant. 1).

Figure 6:
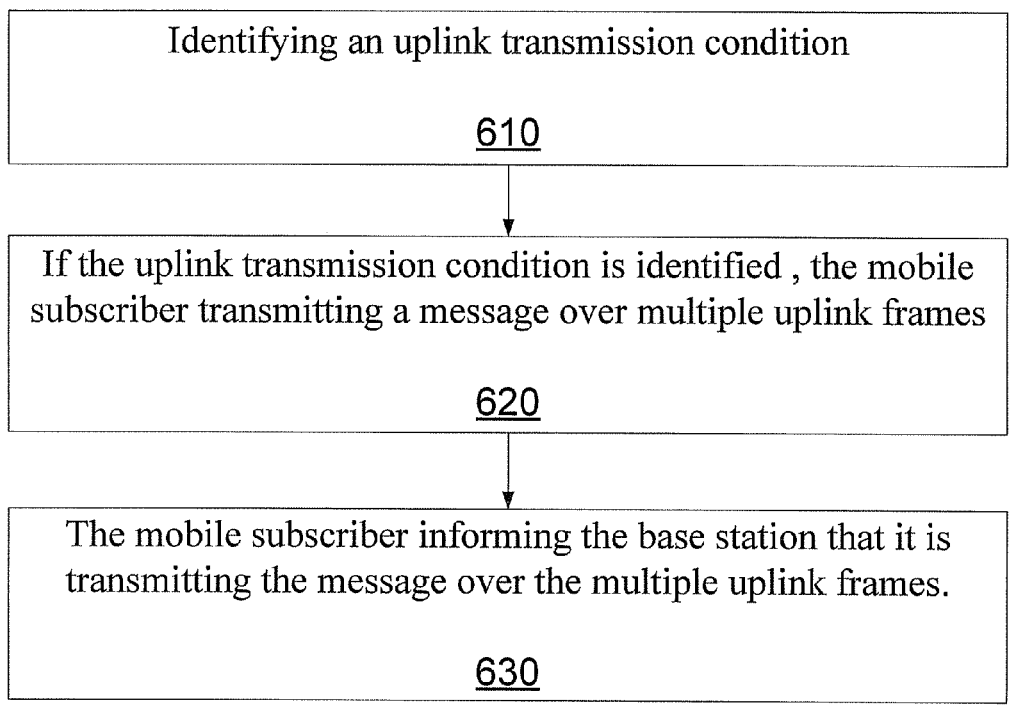
FIG. 6 is a flow chart that includes steps of an example of a method of a mobile subscriber transmitting information to a base station.

FIG. 6 is a flow chart that includes steps of an example of a method of a mobile subscriber transmitting information to a base station. A first step 610 includes identifying an uplink transmission condition. A second step 620 includes if the uplink transmission condition is identified, the mobile subscriber transmitting a message over multiple uplink frames. A third step 630 includes the mobile subscriber informing the base station that it is transmitting the message over the multiple uplink frames. For an embodiment, if the uplink transmission condition is identified, the mobile unit transmits the message over different sets of sub-carriers for at least two of the multiple uplink frames. The different sets of sub-carriers can be defined, for example, by logical sub-channels.

Various parameters can be used for identifying the uplink transmission condition. For an embodiment, the uplink transmission condition is identified by either the mobile or the base station identifying that an available transmission power of the mobile station is not sufficient to meet a desired Quality of Service (QoS) at the base station. For another embodiment, the uplink transmission condition is identified by either the mobile or the base station identifying that the mobile subscriber is proximate to a cell edge. More generally, embodiments of identifying the uplink transmission condition includes at least one of the mobile subscriber or the base station identifying the mobile subscriber being limited by a power rating of a power amplifier of the mobile subscriber, the mobile subscriber being limited by uplink transmission path loss, the mobile subscriber being limited by uplink interference, the mobile subscriber being limited by uplink signal to noise ratio (SNR), or the mobile subscriber being limited by uplink transmit power spectral density.

Generally, the message includes encoded bits. For an embodiment, transmitting the message over multiple uplink frames includes transmitting a same message over multiple uplink frames. For another embodiment, transmitting a message over multiple uplink frames includes transmitting different subsets of the message over the multiple uplink frames. For a more specific embodiment, each subset of the message occupies a minimum time/frequency allocation as determined by a wireless system protocol.

For an embodiment, the mobile subscriber includes multiple antennas. For a specific embodiment, the mobile subscriber introducing a cyclic delay between the antennas, wherein the cyclic delay varies between at least two of the multiple uplink frames. Cyclic Delay Diversity (CDD) is a diversity scheme used in OFDM (orthogonal frequency division modulation) based telecommunication systems, transforming spatial diversity into frequency diversity avoiding inter symbol interference. In telecommunications, a diversity scheme refers to a method for improving the reliability of a message signal by using two or more communication channels with different characteristics. Diversity plays an important role in combating fading and co-channel interference and avoiding error bursts. It is based on the fact that individual channels experience different levels of fading and interference.

For another specific embodiment, the mobile subscriber toggles between the antennas for at least two of the multiple uplink frames.

Figure 7:
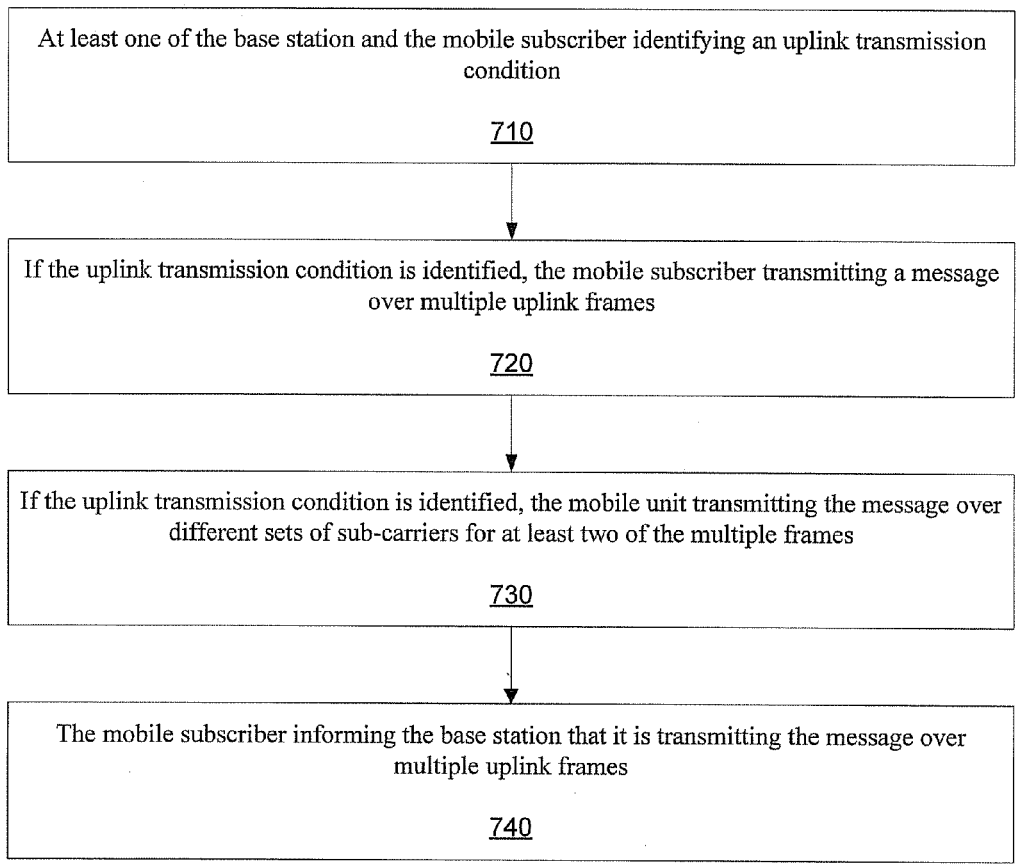
FIG. 7 is a flow chart that includes steps of an example of a method of a wireless system controlling uplink transmitting of information from a mobile station to a base station.

FIG. 7 is a flow chart that includes steps of an example of a method of a wireless system controlling uplink transmitting of information from a mobile station to a base station. A first step 710 includes at least one of the base station and the mobile subscriber identifying an uplink transmission condition. A second step 720 includes if the uplink transmission condition is identified, the mobile subscriber transmitting a message over multiple uplink frames. A third step 730 includes if the uplink transmission condition is identified, the mobile unit transmitting the message over different sets of sub-carriers for at least two of the multiple frames. A fourth step 740 includes the mobile subscriber informing the base station that it is transmitting the message over multiple uplink frames. Any number of the previously described parameters can be used for either the base station or the mobile subscriber identifying the uplink transmission condition.

For an embodiment, transmitting the message over multiple uplink frames includes transmitting different subsets of the message over the multiple uplink frame. An embodiment includes the base station controlling how the mobile station selects subsets of the message. For an embodiment, the base station schedules transmission of the subsets of the message. A more specific embodiment includes the base station scheduling the transmission of the subsets based on at least one of a receive power spectral density of uplink signals received at the base station and a size of the message to be scheduled.

For an embodiment, the base station receives the subsets of the message over the multiple frames and over the different subsets of carriers. For a specific embodiment, the base station transmits an acknowledgement (ACK) or a negative acknowledgement (NACK) after receiving a plurality of subsets of the message.

Figure 8:
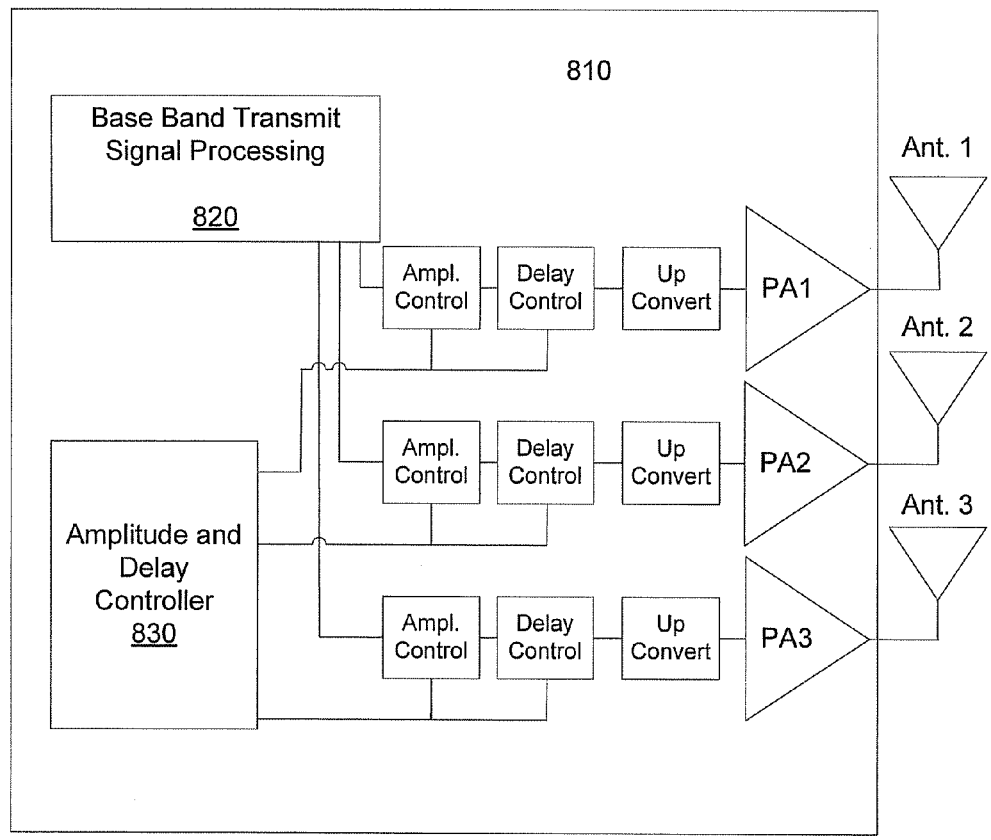
FIG. 8 is a block diagram of an example of a subscriber station that can utilize the described embodiments controlling uplink transmitting of information from a mobile station to a base station.

FIG. 8 is a block diagram of an example of a subscriber station that can utilize the described embodiments for controlling uplink transmission of information from a mobile station to a base station. The exemplary subscriber station 810 includes an amplitude and delay controller 830 and base band transmit signal processing 820. Based upon principles of the described embodiments, the controller 830 provides delay control of transmission signals of the subscriber station. Additionally, the controller 830 can provide amplitude control of transmission signals. Typically, the amplitude control is dependent upon the target transmission power level and the power ratings of the power amplifiers (PA1, PA2, PA3) of each of the antennas.

The order and magnitude of the delay associated with each of the antennas (Ant. 1, Ant. 2, Ant. 3) can be according to previously described embodiments. More specifically, the controller 830 can adjust the delay (for example, CDD) corresponding with each of the antennas (Ant. 1, Ant. 2, Ant. 3) at starting boundaries each of the transmitted uplink frames as shown, for example, in FIG. 5. As previously described, a mobile subscriber that includes multiple antennas, can introduce a cyclic delay between the antennas, wherein the cyclic delay varies between at least two of the multiple uplink frames.

Figure 9:
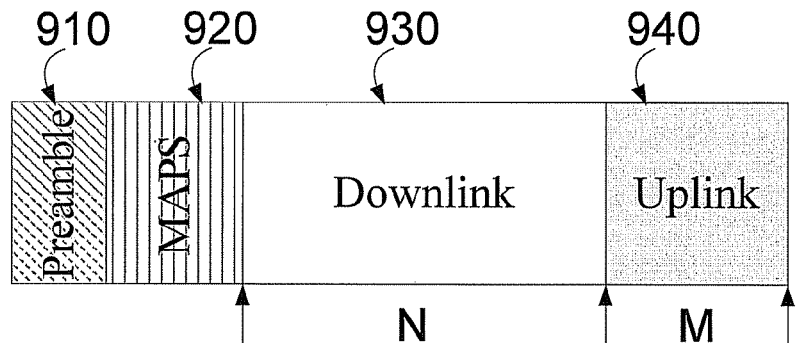
FIG. 9 shows an example of frame type 1 in accordance with the present invention.

FIG. 9 shows an example of a frame in accordance with the present invention. The frame may include a preamble 910 and a medium access protocol (MAP) message 920. The frame may be used in accordance with an OFDM protocol, such as WiMAX or 3G LTE. The frame may be 5 msec in duration. In a TDD system, a frame may be divided between a Downlink (DL) sub-frame 930 and an Uplink (UL) sub-frame 940. Uplink coverage may be limited by a mobile station transmit power. For example, a mobile station transmit power may be 23 dBm (or 200 mWatts). The size of the UL sub-frame may require that messages transmitted on the UL be wrapped around in frequency. This requirement may increase the constraint on the received power per sub-carrier (i.e. power spectral density, PSD). For a given message size (in bytes), extending the UL transmission time may increase the PSD and may improve the UL coverage. However, extending the UL transmission time may reduce the DL throughput. Having a fixed split between DL time (N) and UL time (M) may limit the UL coverage and DL throughput.

Figure 10:
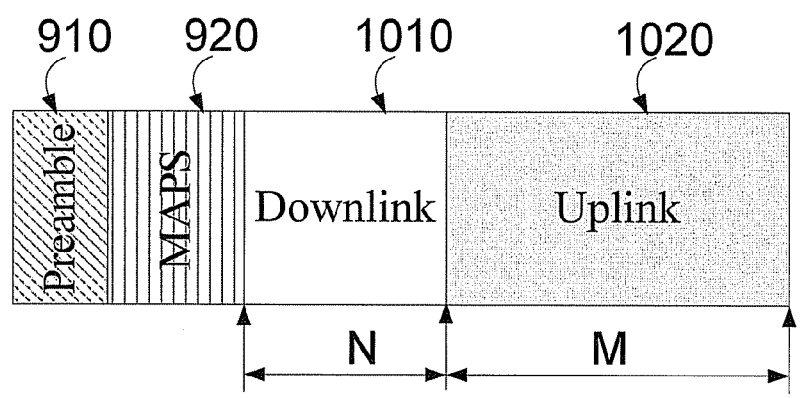
FIG. 10 shows an example of frame type 2 in accordance with the present invention.

To avoid the limitations of the frame format in FIG. 9, a base station and/or mobile subscriber station may be configured to transmit two different frame types that can be interlaced in time. Frame Type 1 may be as shown in FIG. 9, where the DL time (N) is longer than the UL time (M). Frame Type 1 may be used when the carrier to interference plus noise ratio (CINR) is high on the uplink channel. FIG. 10 illustrates a frame comprising a Downlink (DL) sub-frame 1010 and an Uplink (UL) sub-frame 1020. Frame Type 2 may be as shown in FIG. 10, where the DL time (N) is shorter than the UL time (M). Frame Type 2 may be used when the carrier to interference plus noise ratio (CINR) is low on the uplink channel. Low CINR conditions may occur, for example, at the edge of cells.

The ratio (N:M) of the DL time (N) to the UL time (M) may be allocated according to the channel bandwidth. Examples of N:M ratios for type 1 frames in 5 MHz and 10 MHz channels may include: (35:12), (34:13), (33:14), (32:15), (31:16), (30:17), (29:18), (28:19), (27:20) and (26:21). Examples of N:M ratios for type 1 frames in 8.75 MHz channels may include: (30:12), (29:13), (28:14), (27:15), (26:16), (25:17) and (24:18). Examples of N:M ratios for type 1 frames in 3.5 MHz and 7 MHz channels may include: (24:9), (23:10), (22:11), (21:12), (20:13), (19:14) and (18:15). For type 2 frames, the DL time (N) and the UL time (M) may be reversed with respect to the aforementioned examples of type 1 frame ratios.

Figure 11:
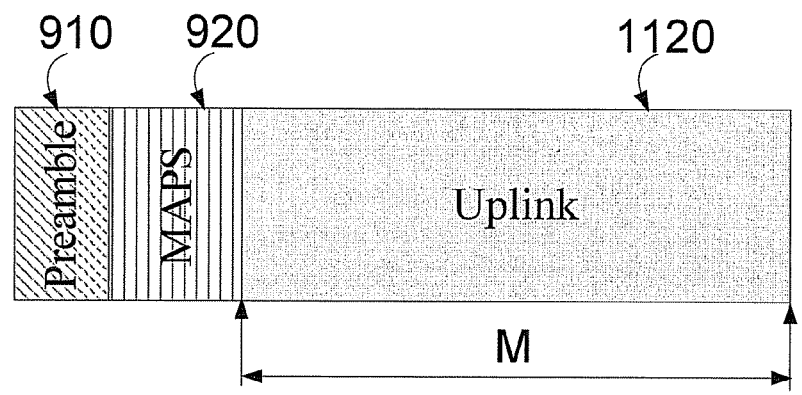
FIG. 11 shows another example of frame type 2 in accordance with the present invention.

FIG. 11 illustrates a frame comprising an Uplink (UL) sub-frame 1120 without a Downlink (DL) sub-frame. FIG. 11 may be an extreme example of a Type 2 frame, where N=0.

A base station may measure the uplink CINR from a ranging message transmission by a mobile subscriber station. The base station may use the CINR to schedule the subscriber station into a given frame type. The special Type 2 frame may be transmitted periodically by either the base station or the subscriber station. The duty cycle for Type 2 frame transmission may be determined by the base station according to the uplink and/or downlink CINR distribution. The transmission of the special radio frame may be known by the subscriber station a prior via a broadcast message from the base station. The base station may signal (using a broadcast channel) to the mobile station a time-offset from the current frame as to when the Type 2 frame transmission will occur. Alternatively, the subscriber station may blindly determine the existence of the special frame by decoding the UL MAP. A base station may split the mobile stations connected to it into two groups (group 1 and group 2) and assign users to each the user groups. For example, group 1 may correspond to frame Type 1, and group 2 may correspond to frame Type 2.

Figure 12:
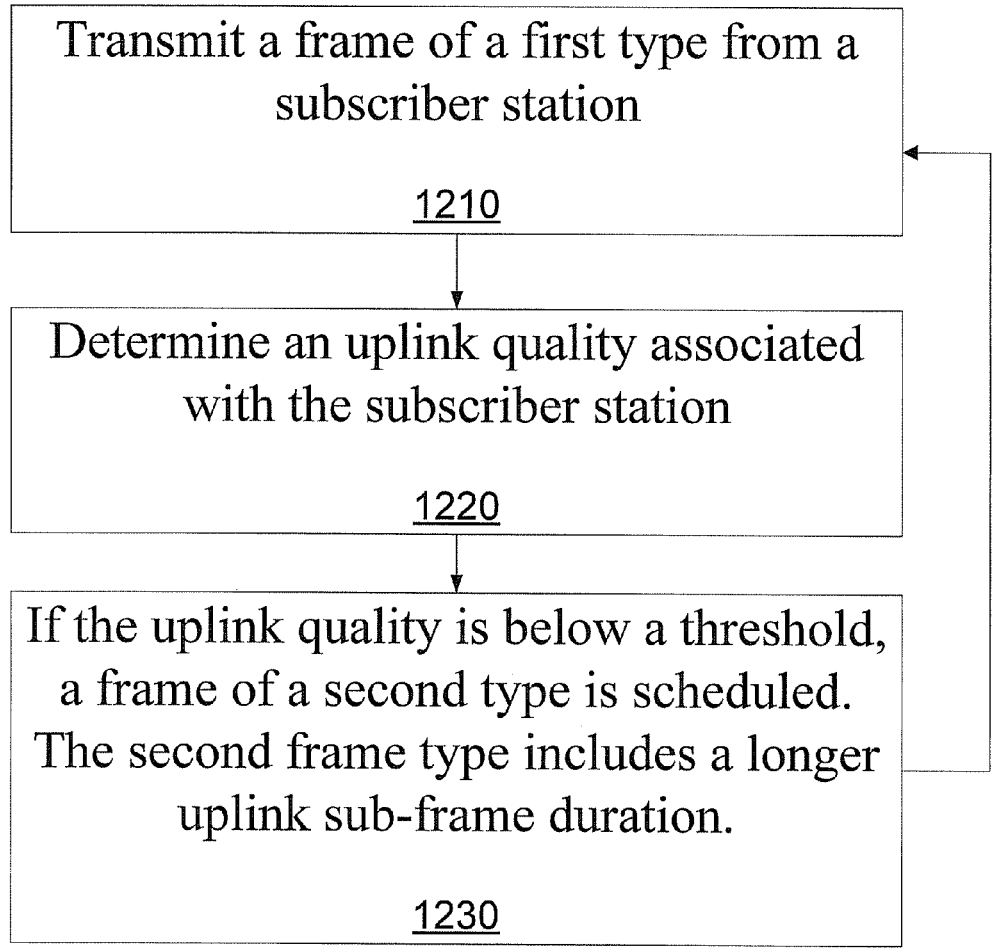
FIG. 12 is a flow chart that includes steps of another example of a method of a wireless system controlling uplink transmitting of information from a mobile station to a base station.

FIG. 12 illustrates a method of uplink transmission. In step 1210, a subscriber station transmits a frame of a first type. In step 1220, a subscriber station uplink quality is determined.

The uplink quality may be determined according to, for example, uplink and/or downlink CINR measurements and reports. If the uplink quality is below a threshold in step 1230, the subscriber station may utilize a special frame type that includes a longer UL sub-frame duration. The subscriber station may determine the subscriber link quality, and utilize the special frame without base station scheduling. Alternatively, the base station may schedule a subscriber station's use of the special frame. A special frame may be scheduled once between N frames of another type. One example of a special frame may have an extended uplink frame duration and a zero duration downlink frame. The special frame uplink transmission allocations may be adaptive depending upon the changing link qualities of a plurality of subscriber stations. Therefore, the method shown in FIG. 12 may be iterated.

Although specific embodiments have been described and illustrated, the embodiments are not to be limited to the specific forms or arrangements of parts so described and illustrated. The embodiments are limited only by the appended claims.

What is claimed:

1. A method for transmitting information, the method comprising:
   transmitting a first portion of a message over one or more first uplink sub-frames from among a plurality of uplink sub-frames, the one or more first uplink sub-frames being of a first type including an uplink sub-frame duration and a downlink sub-frame duration;
   identifying an uplink transmission condition;
   adjusting, when the uplink transmission condition meets a predetermined condition, the uplink sub-frame duration and the downlink sub-frame duration to provide a second type that has a substantially similar duration as the first type; and
   transmitting a second portion of the message over one or more second uplink sub-frames from among the plurality of uplink sub-frames, the one or more second uplink sub-frames being of the second type.

2. The method of claim 1, wherein the identifying the uplink transmission condition comprises identifying an uplink quality as determined by a carrier to interference plus noise measurement.

3. The method of claim 1, wherein the identifying the uplink transmission condition comprises:
   identifying a subscriber link quality, and wherein the transmitting the second portion of the message comprises:
   transmitting, based on the subscriber link quality, the second portion of the message without base station scheduling.

4. The method of claim 1, further comprising:
   receiving, from a base station, a second message to transmit the second portion of the message.

5. The method of claim 1, further comprising:
   transmitting a third portion of the message over one or more third uplink sub-frames from among the plurality of uplink sub-frames after transmitting the second portion of the message, the one or more third uplink sub-frames being of the first type.

6. The method of claim 1, wherein the second type comprises:
   a zero duration downlink sub-frame.

7. The method of claim 1, wherein the transmitting the second portion of the message comprises:
   adapting a rate of transmitting the second portion of the message according to the uplink transmission condition.

8. The method of claim 1, further comprising:
   informing a base station that the message is being transmitted over the plurality of uplink sub-frames.

9. The method of claim 1, further comprising:
   receiving an assignment of a subscriber to either a first group or to a second group, wherein the first group corresponds to the first type and the second group corresponds to the second type.

10. The method of claim 1, further comprising:
    allocating a ratio of the downlink sub-frame duration to the uplink sub-frame duration based on a bandwidth of a channel between a subscriber and a base station.

11. The method of claim 1, wherein the adjusting further comprises:
    adjusting a ratio of the downlink sub-frame duration to the uplink sub-frame duration based on the uplink transmission condition.

12. The method of claim 1, wherein the transmitting the first portion of the message comprises:
    transmitting the first portion of the message utilizing only a carrier at different instances in time.

13. The method of claim 1, wherein the transmitting the first portion of the message and the transmitting the second portion of the message utilizes time-division duplexing (TDD).

14. A system for transmitting information, the system comprising:
    a transmitter configured to transmit a first portion of a message over one or more first uplink sub-frames from among a plurality of uplink sub-frames, the one or more first uplink sub-frames being of a first type including a first uplink sub-frame duration; and
    a processor configured to:
    identify an uplink transmission condition;
    determine whether the uplink transmission condition meets a predetermined condition; and
    adjust, when the uplink transmission condition meets the predetermined condition, the first uplink sub-frame duration to a second uplink sub-frame duration to provide a frame of a second type,
    wherein the transmitter is further configured to transmit a second portion of the message over one or more second uplink sub-frames from among the plurality of uplink sub-frames, the one or more second uplink sub-frames being of the second type.

15. The system of claim 14, wherein the uplink transmission condition comprises an uplink quality as determined by a carrier to interference plus noise measurement.

16. The system of claim 14, wherein the system includes a subscriber station comprising the processor and the transmitter.

17. The system of claim 14, wherein the subscriber station is configured to select the frame of the second type to transmit the second portion of the message without being directed by a base station.

18. The system of claim 16, wherein a base station directs the subscriber station to use the frame of the second type to transmit the second portion of the message.

19. The system of claim 14, wherein the transmitter is further configured to transmit a third portion of the message over one or more third uplink sub-frames from among the plurality of uplink sub-frames after transmitting the second portion of the message, the one or more third uplink sub-frames being of the first type.

20. The system of claim 14, wherein the second type comprises a zero duration download sub-frame.

21. The system of claim 14, wherein the processor is further configured to adapt a rate of transmitting the second portion of the message according to the uplink transmission condition.

22. The system of claim 14, wherein a base station is configured to assign a subscriber to either a first group or to a second group, wherein the first group corresponds to the first type and the second group corresponds to the second type.

23. The system of claim 14, wherein the transmitter is configured to transmit the first portion of the message utilizing only a carrier at different instances in time.

24. The system of claim 14, wherein the transmitter is configured to transmit the first portion of the message and the second portion of the message utilizing time-division duplexing (TDD).

\* \* \* \* \*